United States Patent [19]

Sumiya et al.

[11] Patent Number: 5,638,206
[45] Date of Patent: Jun. 10, 1997

[54] CONFOCAL OPTICAL MICROSCOPE AND LENGTH MEASURING DEVICE USING THIS MICROSCOPE

[75] Inventors: Masato Sumiya, Yokohama; Shinji Suzuki, Kawasaki, both of Japan

[73] Assignee: Ushiodenki Kabushiki Kaisha, Japan

[21] Appl. No.: 314,650

[22] Filed: Sep. 29, 1994

[30] Foreign Application Priority Data

Sep. 29, 1993 [JP] Japan .................. 5-264076
Nov. 29, 1993 [JP] Japan .................. 5-320822

[51] Int. Cl.⁶ .................. G02B 21/00; G02B 21/06; G02B 21/26
[52] U.S. Cl. .................. 359/368; 359/371; 359/385; 359/392; 359/393; 359/388
[58] Field of Search .................. 359/235, 368, 359/371, 372, 385, 386, 387, 391, 392, 393, 394, 388

[56] References Cited

U.S. PATENT DOCUMENTS

| | | | |
|---|---|---|---|
| 4,747,111 | 5/1988 | Trutna, Jr. et al. | 372/94 |
| 4,863,226 | 9/1989 | Houpt et al. | 359/212 |
| 4,864,123 | 9/1989 | Mizutani et al. | 250/225 |
| 4,927,254 | 5/1990 | Kino et al. | 359/235 |
| 5,022,743 | 6/1991 | Kino et al. | 359/235 |
| 5,067,805 | 11/1991 | Corle et al. | 359/235 |
| 5,101,295 | 3/1992 | Lichtman et al. | 359/235 |
| 5,194,918 | 3/1993 | Kino et al. | 356/359 |
| 5,248,876 | 9/1993 | Kerstens et al. | 250/561 |
| 5,420,717 | 5/1995 | Tabata | 359/386 |
| 5,479,252 | 12/1995 | Worster et al. | 356/237 |

*Primary Examiner*—Paul M. Dzierzynski
*Assistant Examiner*—Mohammad Y. Sikder
*Attorney, Agent, or Firm*—Sixbey, Friedman, Leedom & Ferguson, P.C.; David S. Safran

[57] ABSTRACT

A first a confocal optical microscope in which a good image with high contrast can be observed with which a bright image can be observed over a long time interval. The confocal optical microscope has a quarter wave plate arranged in an optical path between an imaging lens and an objective such that it is inclined relative to a reference optics axis extending between the imaging lens and the objective. Furthermore, the confocal optical microscope has a short-wave radiation attenuator for attenuating light radiated from the light source with wavelengths of less than or equal to 340 nm. The confocal optical microscope can form part of a length measuring device which can take a length measurement of a sample to be measured with high measurement accuracy and high reproducibility. The length measuring device also has a movable carrier, a carrier device for a sample to be measured, a computing device, a display device and a control device.

4 Claims, 4 Drawing Sheets

CONFOCAL OPTICAL MICROSCOPE AND LENGTH MEASURING DEVICE USING THIS MICROSCOPE

BACKGROUND OF THE INVENTION

1. Field of the Invention

The invention relates to a confocal optical microscope and length measuring device using this microscope.

2. Description of Related Art

Conventionally a confocal optical microscope is used, applying its characteristic of a depth of focus which is extremely short, for viewing shapes such as cross-sectional shapes or the like, fine objects in biology, semiconductor technology or the like, and for purposes of various measurements in a suitable manner.

In addition, conventionally, for example, for measuring the length of a line width of a resist pattern formed on a semiconductor wafer (width of a resist line) or a pattern distance (distance between adjacent resist lines) or for length measurement of a photomask pattern for exposure, a length measuring device is used which has an optical microscope. The semiconductor wafer is hereinafter called only a "wafer".

Since a resist layer thickness according to a refinement of the pattern has recently tended to become smaller as well, there is a need for a length measuring device using a microscope with a shallow focal depth. With respect to the facts described above, a length measuring device using a confocal optical microscope has been developed which has the advantage that its focal depth is low to the greatest degree.

Figure 6:
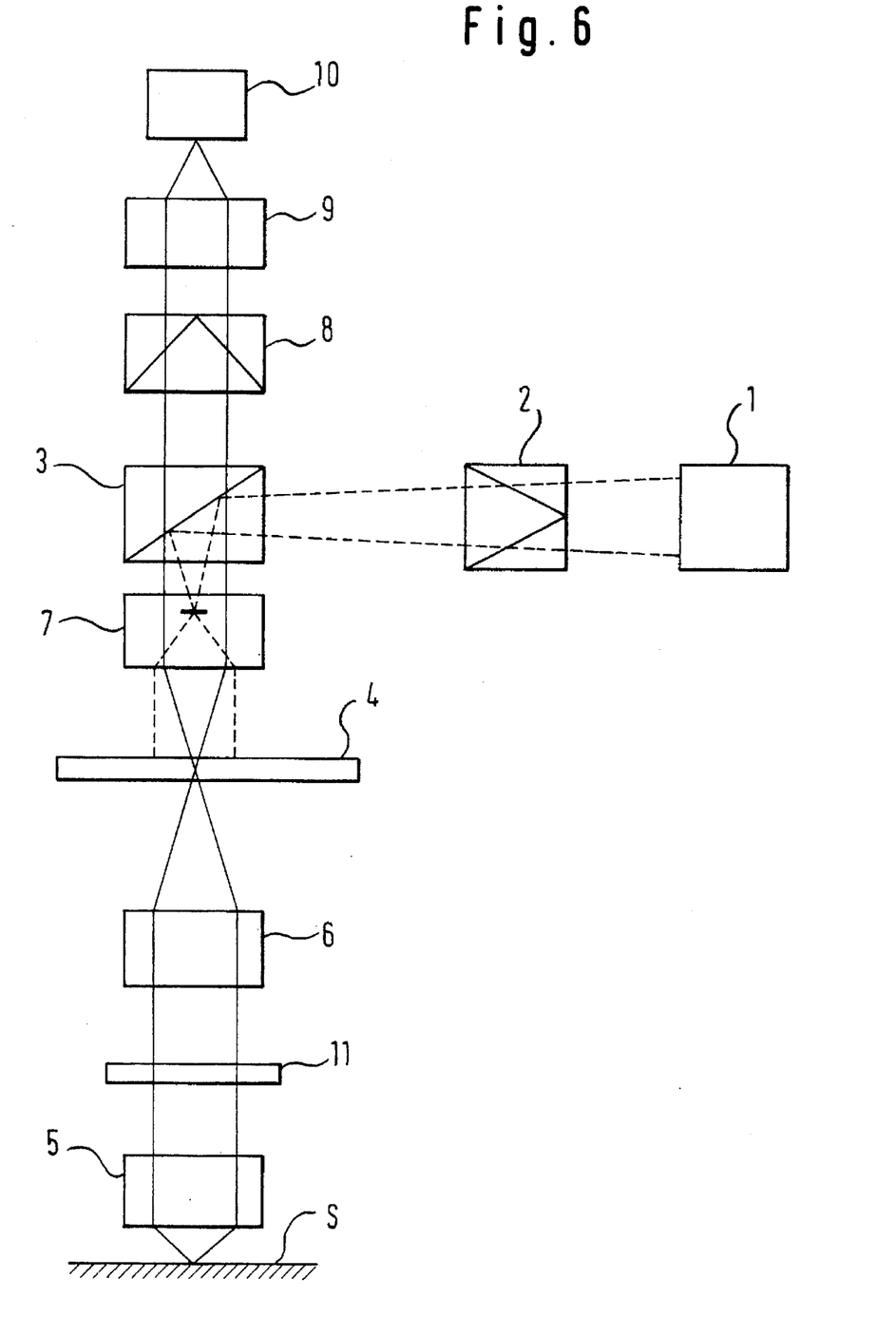

FIG. 6 schematically illustrates one important configuration of a conventional confocal optical microscope which is installed in a conventional length measuring device. In the representation, reference numeral 1 designates an illumination optics system, 2 a first polarizer consisting of a polarization plate, 3 a polarizing beam splitter, 4 a aperture plate with a pinhole, 5 a first objective, 6 an imaging lens, 7 a second objective, 8 a second polarizer consisting of an analyzer, 9 a second imaging lens, 10 a picture recording means consisting of a camera and the like, and 11 a quarter wave plate.

In a confocal optical microscope with this type of configuration, radiation light from illumination optics system 1 is converted by means of first polarizer 2 into a linear polarization. Subsequently, by means of polarizing beam splitter 3 it is reflected and locally irradiates one surface of aperture plate 4 which has the pinhole. An area which is locally irradiated in this process corresponds essentially to a field of view of the picture recording means 10. The term "field of view of picture recording means 10" is defined as an area on the aperture plate in which the picture recording means can gather light.

In the light for local irradiation, a light flux which has travelled through the pinhole of aperture plate 4 is converted into parallel light or essentially parallel light by means of first imaging lens 6 and is incident on first objective 5. Between this imaging lens 6 and objective 5 is quarter wave plate 11. The linearly polarized light which is aligned from first imaging lens 6 towards objective 5 is converted by one pass through this quarter wave plate 11 from linear polarization into circular polarization.

The light incident on first objective 5 is concentrated on one surface of sample S to be measured. In this way, a point of sample S to be measured is irradiated.

Reflected light from sample S to be measured travels again through first objective 5, quarter wave plate 11 and first imaging lens 6 and is again imaged in the pinhole of aperture plate 4. The reflected light which is directed from first objective 5 to first imaging lens 6 is converted by passing once again through quarter wave plate 11 from circular polarization into linear polarization which has a polarization direction turned 90° relative to the illumination light.

The light reflected by polarizing beam splitter 3, as the result of passing twice through quarter wave plate 11 before and after irradiation of sample S, travels through aperture plate 4 in a state of linear polarization. Since, however, in doing so the polarization directions are different, the reflected light which has travelled through the pinhole of aperture plate 4 after one passage through second objective 7 passes through second polarizer 8 and second imaging lens 9 and is gathered up by picture recording means 10 without being reflected by polarizing beam splitter 3.

Reflected light which has travelled through the pinhole of aperture plate 4 travels after one passage through second objective 7, polarizing beam splitter 3, second polarizer 8 and second imaging lens 9 and is gathered up by picture recording means 10.

In FIG. 6, a broken line designates an optical path of all illumination light which reaches as far as aperture plate 4 from the illumination optics system 1, and a solid line designates an optical path in which the light which has travelled through a pinhole of aperture plate 4 is concentrated on sample S and reflected, and then reaches picture recording means 10.

By means of the arrangements of first polarizer 2 (polarizing plate) described above in the optical path between illumination optics system 1 and the polarizing beam splitter 3, second polarizer 8 (analyzer) in the optical path between polarizing beam splitter 3 and the picture recording means 10 as well as quarter wave plate 11 in the optical path between the first objective 5 and the first imaging lens 6, the reflected light from sample S is differentiated from the scattered light reflected from the surface of aperture plate 4; the scattered light is for the most part not gathered by picture recording means 10. In this way, a reduction of the contrast, which is caused by gathering scattered light from the surface of the aperture plate 4, is prevented and a relatively good image can be observed.

A confocal optical microscope with the configuration described above is disclosed, for example, in the Japanese patent publication HEI 1-503493. In this publication, a scanning disk (rotating Nipkow disk) provided with pinholes is used as the aperture plate, by means of which measurement of an entire image of the sample in real time is enabled.

In a length measuring device which has a confocal optical microscope with the configuration described above, a length of material components of the aforementioned sample to be measured which was described above (for example, the magnitude of the width of a resist line) and a length between the material components described above (for example, a distance between resist lines) are measured based on an enlarged image which is picked up by the confocal optical microscope. To take an exact measurement, therefore, it is necessary that the contrast of the aforementioned enlarged image has a certain level. In the case in which the contrast is low, it becomes difficult to recognize and determine positions of starts and ends (for example, ends of the resist line) of the material component of the sample to be measured, the length of which or the lengths between which must be measured. Consequently, the reliability of measurement results decreases.

For the confocal optical microscope shown in FIG. 6, by means of the configurations of first polarizer 2 (polarizing plate) in the optical path between illumination optics system 1 and polarizing beam splitter 3, the second polarizer 8 (analyzer) in the optical path between the polarizing beam splitter 3 and picture recording means 10, as well as the quarter wave plate 11 in the optical path between the first objective 5 and first imaging lens 6, the reflected light from sample S to be measured is distinguished from the scattered light reflected from the surface of aperture plate 4; the scattered light is for the most part not gathered by the picture recording means 10. In this way a reduction of the contrast is prevented which is caused by gathering scattered light from the surface of aperture plate 4.

The conventional confocal optical microscope and conventional length measuring device with a confocal optical microscope, however, have the following disadvantages:

(1) In a confocal optical microscope with the configuration shown in FIG. 6, the light flux of the light which travels through a pinhole of aperture plate 4, and which is incident on first objective 5 from the imaging lens 6, is converted into an essentially parallel light flux.

Figure 5:
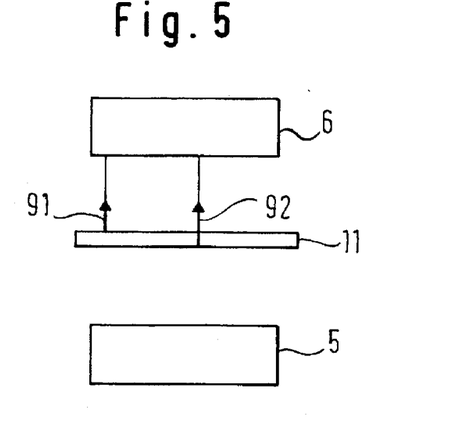
FIGS. 5 & 6 are schematic representations of an important configuration of a conventional confocal optical microscope which is installed in a conventional length measuring device.

Consequently, as shown in FIG. 5, the reflected light 91 which is part of the light which has travelled through the pinhole of aperture plate 4 and which was reflected from the surface of quarter wave plate 11, as well as reflected light 92 which has been reflected from the rear side of quarter wave plate 11, after passage through first imaging lens 6 are concentrated again into the pinhole in the locally irradiated area of aperture plate 4.

The reflected light which was concentrated in the locally irradiated area which essentially corresponds to the field of view of picture recording means 10, including especially reflected light 92 which was reflected from the rear side of quarter wave plate 11 as the result of the polarization direction turned 90° relative to the illumination light is finally, for the most part, gathered by picture recording means 10, and furthermore, as the result of passing through quarter wave plate 11 essentially twice, has the same polarization characteristic as the light reflected from sample S. The light is finally gathered by picture recording means 10 and reduces the image contrast as a stray beam, which has been reflected from locations other than from sample S.

This reduction of contrast which is caused by reflected light from the surface and/or the rear side of the quarter wave plate 11 reduces measurement accuracy and the reproducibility of the length measuring device and thus adversely affects the reliability of measurement results.

(2) Upon repeated uses of the confocal optical microscope, an adhesive for joining the lenses and lens systems which comprise the optical systems of the microscope is degraded over time, and light transmission in these optical systems decreases after a relatively short time. With the decrease of light transmission, the image to be observed becomes darker overall and difficult to recognize.

The measurement accuracy and reproducibility of the length measuring device decrease and the reliability of the measurement results is adversely affected because 1) as the result of a small amount of light for picture recording means 10, a sufficient SN (signal to noise) ratio is not obtained and 2) as the result of a fluctuation of measurement conditions which occurs over time (a reduction in the amount of light over time), measurement errors arise.

SUMMARY OF THE INVENTION

In view of the facts described above, a first object of the present invention is to devise a confocal optical microscope in which the picking up of stray beams by a picture recording means can be reduced as much as possible, the SN ratio can be increased and an advantageous (good) image with high contrast can be observed.

Another object of the invention is to devise a confocal optical microscope in which stable maintenance of high light transmission in optical systems can be achieved, and a bright image can be observed over a long time interval.

Theses objects are achieved, according to the invention, by the fact that, in a confocal optical microscope which has a aperture plate provided with a pinhole or pinholes, a light source for local irradiation of one side of this aperture plate, an objective arranged adjacent to a sample to be observed on one opposite side of the aperture plate, an imaging lens which is used together with the objective and which is arranged for imaging the sample onto the aforementioned aperture plate in the optical path between the aperture plate and the objective, a quarter wave plate located in an optical path between this imaging lens and the objective, a polarizing beam splitter which is located on one side of the aperture plate in an optical path between the light source and the quarter wave plate, as well as a picture recording means for gathering the light of the reflected light from the sample, which travels through this polarizing beam splitter, as well as for picking up the image of the sample, the quarter wave plate is arranged such that a perpendicular on its surface is tilted to an optical axis formed by the objective and the imaging lens.

In the confocal optical microscope according to the present invention, it is desirable to arrange a first polarizer between the light source and the polarizing beam splitter for polarization of the light irradiating one side of the aperture plate and a second polarizer in the optical path between the polarizing beam splitter and picture recording means.

In the confocal optical microscope according to the invention, it is, moreover, desirable to arrange a compensation plate of the optical axis in the optical path between the objective and the imaging lens. This compensation plates serves for correction of a deviation of the optical axis, in front of and behind the quarter wave plate, which is caused by the tilt of the quarter wave plate.

In the confocal optical microscope according to the invention it is furthermore desirable to arrange a shortwave radiation attenuation means for attenuation of light at least with wavelengths of less than or equal to 340 nm under the radiation light from the aforementioned light source.

Moreover, in the confocal optical microscope according to the present invention, it is, furthermore, desirable that the aperture plate is a rotating scanning disk provided with pinholes.

According to the invention, the advantages described below are achieved:

(1) By means of the arrangement in which the quarter wave plate is tilted to an optical axis formed by the objective and the imaging lens, the reflected light from the surface and the rear side of the quarter wave plate is not concentrated in the locally irradiated area of the aperture plate which agrees with the field of view of the picture recording means. Therefore, this reflected light is not gathered by the picture recording means and a good image with high contrast can be observed.

(2) By means of the arrangement of the compensation plate of the optical axis which is as simple as possible in the optical path between the objective and the imaging lens the deviation of the optical axis which is caused by the tilt of the quarter wave plate is eliminated with certainty. In this way formation of an optical imaging error due to the deviation of the optical axis can be reliably prevented.

(3) By means of the attenuation of the short-wave light which degrades the adhesive for joining the lenses or lens systems using the shortwave radiation attenuation means, high light transmission can be stably maintained in the optical systems and a bright image can be observed over a longer time interval.

Another object of the invention is to devise a length measuring device with high reliability, by which a length measurement of a sample to be measured can be obtained with high accuracy and high reproducibility by minimizing the picking up of stray beams by a picture recording means, by increasing the SN ratio and by picking up a partially enlarged image of the sample to be measured with high contrast in a confocal optical microscope.

An additional object of the invention is to devise a length measuring device in which stable maintenance of high light transmission in optical systems of a confocal optical microscope can be achieved and reliability of measurement results can be maintained over a long time interval.

This object is achieved according to the invention by the fact that, in a length measuring device which has a movable carrier which enables at least one movement forward, backward, to the right and to the left (in the direction of axis X-Y) and movement in the vertical direction (direction of axis Z), a carrier device for a sample to be measured for bearing the sample to be measured and for seating the latter on the moveable carrier, an optical microscope which picks up a partially enlarged image of the sample to be measured seated on the movable carrier, a computing means for computing a length of material components or between the material components of the sample to be measured based on the partially enlarged image of the sample to be measured which was picked up by the optical microscope, a display means for displaying of the partially enlarged image of the sample to be measured which was picked up by the optical microscope, as well as of measurement results which have been computed by means of the computing means, as well as a control means for control of the movable carrier, furthermore of the carrier device for the sample to be measured, of the optical microscope, of the computing means, and of the display means under the stipulated measurement conditions, the optical microscope is a confocal optical microscope which has a aperture plate provided with a pinhole or pinholes, a light source for local irradiation of one side of this aperture plate, a first polarizer for polarization of the light irradiating one side of the aperture plate, an objective which is arranged adjacently to the sample to be measured on an opposite side of the aperture plate, an imaging lens which is used together with the objective and which is arranged for imaging a partially enlarged image of the sample to be measured onto the aperture plate in an optical path between the aperture plate and the objective, a quarter wave plate located in an optical path between this imaging lens and the objective, a polarizing beam splitter which is located on one side of the aperture plate in an optical path between the first polarizer and the quarter wave plate, a picture recording means for gathering light of the reflected light from the sample to be measured which travels through this polarizing beam splitter, and for picking up the partially enlarged image of the sample to be measured, and a second polarizer which is located in an optical path between the polarizing beam splitter and the picture recording means, and in which the quarter wave plate is arranged such that a perpendicular on its surface is tilted to an optical axis formed by the objective and the imaging lens.

The object of the invention is, furthermore, advantageously achieved by the length measuring device having a confocal optical microscope in which, in the optical path between the objective and imaging lens, there is an optical axis compensation plate for correcting a deviation of the optical axis in front of and behind the quarter wave plate due to the tilt of the quarter wave plate.

The object of the invention is, furthermore, advantageously achieved by the length measuring device having a confocal optical microscope in which there is a shortwave radiation attenuation means for attenuating light at least with wavelengths of less than or equal to 340 nm under the radiation light from the light source.

Moreover, the object of the invention is, also, advantageously achieved by the length measuring device having a confocal optical microscope in which the aperture plate is a rotating scanning plate provided with pinholes.

According to the invention, the advantages described below are achieved:

(1) By means of the arrangement with the confocal optical microscope which forms the length measuring device, in which the quarter wave plate is tilted to the optical axis formed by the objective and the imaging lens, the reflected light from the surface and/or the rear side of the quarter wave plate is not concentrated in the locally irradiated area of the aperture plate which agrees with the field of view of the picture recording means. Therefore, this reflected light is not gathered by the picture recording means, and a partially enlarged image of the recorded sample to be measured is obtained with high contrast.

Since length measurement based on this partially enlarged image is done with high contrast, the positions of starts and ends of material components of the sample to be measured or between the material components (boundary regions of light-dark in the partially enlarged image) can be recognized and determined in a simple, and at the same time, accurate manner. In this way, measurement results with high measurement accuracy and high measurement reproducibility can be obtained.

(2) In the confocal optical microscope which forms the length measuring device, by means of the arrangement of the compensation plate of the optical axis, which is as simple as possible, between the objective and the imaging lens, the deviation of the optical axis caused by the tilt of the quarter wave plate is eliminated with certainty. In this way, formation of an optical imaging error due to deviation of the optical axis can be reliably prevented, the contrast of the partially enlarged image of the sample to be measured can be increased even more, and the measurement accuracy and reproducibility can be improved even more.

(3) In the confocal optical microscope which forms the length measuring device, by attenuating the shortwave light which degrades an adhesive for joining the lenses or lens systems by means of a short-wave radiation attenuation means, high light transmission in the optical systems can be stably maintained and any reduction of the amount of light for the picture recording means can be prevented. In this way, a sufficient initial SN ratio can be ensured and at the same time the reliability of the measurement results can be maintained over a long time interval since fluctuation of the measurement conditions over time does not occur.

These and further objects, features and advantages of the present invention will become apparent from the following description when taken in connection with the accompanying drawings which, for purposes of illustration only, show a preferred embodiment in accordance with the present invention.

DETAILED DESCRIPTION OF THE PREFERRED EMBODIMENTS

Figure 1:
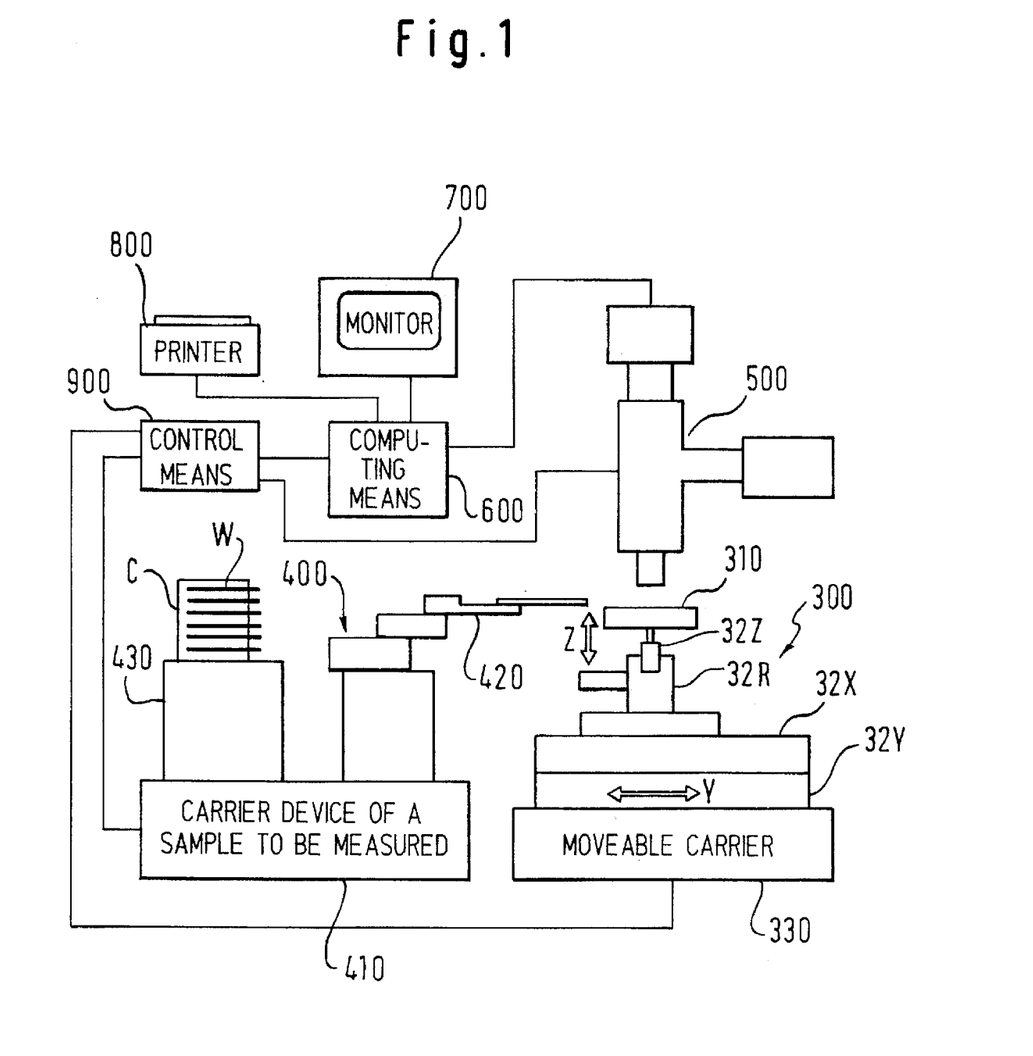
FIG. 1 shows a schematic arrangement of the length measuring device according to the invention.

FIG. 1 schematically shows an arrangement of a length measuring device according to the invention, by which the width of a resist pattern formed on a wafer as well as a distance between the patterns can be measured along a line.

In the representation, reference number 300 designates a movable carrier, reference numeral 400 designates a carrier device of a sample to be measured, reference numeral 500 indicates a confocal optical microscope, reference numeral 600 indicates a computation means, reference numeral 700 indicates a monitor, reference numeral 800 indicates a printer, and reference number 900 designates a control means.

Moveable carrier 300 comprises a carrier stage 310 of a moving device 32X for moving a carrier stage 310 in the vertical direction (in the direction of a z axis represented by a double-arrow Z in the drawing), a turning device 32R for rotating the carrier stage 310 around axis z, a moving device 32X for moving the carrier stage 310 forward and backward (in the direction of an axis X into and out of the plane of the drawing), a moving device 32Y for moving the carrier stage 310 to the right and left (in the direction of axis Y which is shown in the drawing by a double-arrow Y), and fixed base 330. Carrier stage 310 can be moved forward and backward (in the direction of axis X), to the right and to the left (in the direction of axis Y), in the vertical direction (in the direction of axis Z), and can be rotated about the axis Z.

Moving device 32X and moving device 32Y are moving devices using a DC servomotor, and based on a high precision ball roller spindle mechanism, they have a full stroke of 200 mm and a position holding accuracy of less than or equal to ±5 micron. They can likewise be used for an 8 inch wafer.

Moving device 32Z enables two types of movement, i.e., flutter by the motor (with a stroke of 3 mm and a positional accuracy of less than or equal to ±5 micron) and slight movement by piezoelements (with a stroke of 45 microns, a positional accuracy of less than or equal to 10 mm and a minimum motion step of 12 nm). Since slight movement by piezoelements is possible, high positioning accuracy in the direction of the Z axis can be ensured and satisfactory use can be achieved for the confocal optical microscope 500 with a shallow focal depth.

The carrier device for the sample S to be measured is comprised of a base 410, a high speed carrier robot 420, and a wafer carrier cassette 430, and is used to set the sample S on the carrier stage 320 of the movable carrier 300. The high speed carrier robot 420 takes a wafer W out of wafer carrier cassette C using a vacuum suction system, holds it securely, carries it to movable carrier 300 and sets it on carrier stage 310 thereof. After completion of a length measurement, wafer W is returned to another carrier cassette 430 (not shown) by means of high speed carrier robot 420. By means of this carrier device for the sample S to be measured, the removing, feeding to the movable carrier, seating on the carrier stage, returning from the movable carrier and inserting of the wafer, can each be done quickly and at the same time cleanly.

Figure 2:
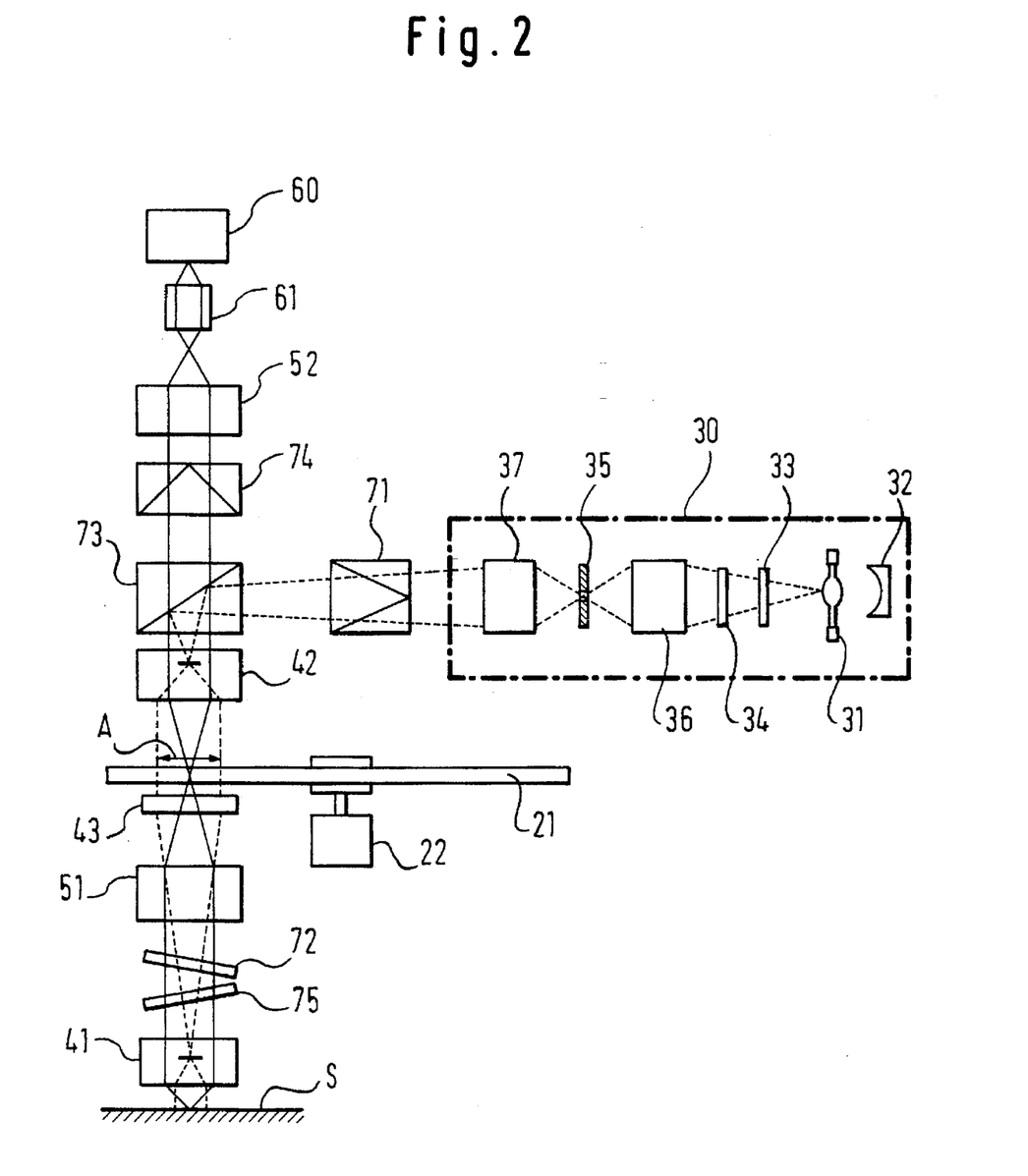
FIG. 2 shows a schematic representation of an arrangement of the confocal optical microscope according to the invention which forms the length measuring device according to the invention.

The confocal optical microscope 500 is a means for picking up a partially enlarged image of the wafer located on carrier stage 310. FIG. 2 schematically illustrates one configuration of the confocal optical microscope according to the invention.

In FIG. 2, reference numeral 21 designates an aperture plate in the form of a rotating scanning disk in which pinholes with a diameter of 20 microns are formed in a spiral pattern. This rotating scanning disk 21 can be produced by vapor deposition of an opaque film of chromium on a disk which consists of quartz which is provided with pinholes. Reference numeral 22 designates a drive means for turning this rotating scanning disk 21, for example, with a speed of 1500 rpm.

Reference numeral 30 designates an illumination optics system for local irradiation of one side of rotating scanning disk 21, numeral 31 designates a light source, numeral 32 indicates a reflector, reference numeral 33 indicates an infrared cut filter, reference numeral 34 identifies an ultraviolet radiation cut filter, which is one of the features according to the invention, reference number 35 indicates a plate-like part in the center of which a pinhole is formed, reference numeral 36 designates an arc relay lens for concentration of light from the light source 31 into the pinhole of plate-like part 35, and reference numeral 37 designates a pinhole relay lens.

For light source 31, for example, a xenon lamp, especially a xenon short arc lamp with a 75 W nominal power can be used in a suitable manner. This lamp is characterized by an arrangement of electrodes in which a sintered body in which emitter powder has been mixed is inserted into an electrode main part formed of a metal with a high melting point, head to head directly next to one another and with a good adhesion property.

In this way, even higher stability of the arc is obtained in comparison to a conventional low power xenon lamp, and a power consumption of less than or equal to 1 kW, a reduction of the fluctuation of the illumination light, a long service life of the lamp, and maintenance of arc stability over a long time interval can be achieved.

A xenon short arc lamp of this type is, for example, described in Japanese patent publications SHO 62-241230 and SHO 62-241253. For light source 31, however, not only lamps with these configurations, but of course, also different types of lamps can be used.

The light which has travelled through the pinhole formed in plate-shaped part 35 has a high light intensity without fluctuation and a uniform light flux. The pinhole in plate-shaped part 35, in this embodiment, has a diameter of 0.4 mm which is determined with respect to light intensity, uniformity of the light flux, an amount of light necessary for illumination, and the like.

The reference numeral 41 designates a first objective, reference numeral 42 indicates a second objective, numeral 51 a first imaging lens, reference numeral 52 indicates a second imaging lens, and reference numeral 43 designates a field lens. First objective 41 is arranged adjacent to a sample S to be observed (in this embodiment, a wafer on which a photoresist pattern is formed).

First imaging lens 51 and first objective 41 are lenses which image a partially enlarged image of sample S to be measured onto the pinholes of rotating scanning disk 21. A light flux between the first objective 41 and the first imaging lens 51 is in a state of a parallel light or in a similar state.

Reference numeral 60 designates a picture recording means consisting of a CCD camera, and reference numeral 61 designates an eyepiece for changing sensitivity factors. The speed of rotating scanning disk 21 (1500 rpm) is set by synchronization with a video frame rate of the CCD camera which comprises picture recording means 60.

Reference numeral 71 designates a first polarizer which polarizes the illumination light from illumination optics system 30 (converted into a linear polarization).

Reference numeral 72 designates a quarter wave plate which is located in an optical path between the first imaging lens 51 and the first objective 41. This quarter wave plate 72 can, for example, be produced by sheet metal layers of a quartz plate with a thickness of 0.2 mm and a plate of magnesium fluoride with a thickness of 0.25 mm. Quarter wave plate 72, produced in this way, generates, in a relatively wide wavelength range from roughly 400 nm to 700 nm, a phase difference of $\frac{1}{5}\lambda$ to $\frac{1}{3}\lambda$ ($\lambda$: wavelength of the incident light).

Reference numeral 73 designates a polarizing beam splitter which is located in an optical path between the first polarizer 71 and the quarter wave plate 72. This polarization beam splitter 73 can be produced by joining two triangular prisms. On a connection surface thereof, a dielectric multilayer film is formed by vapor deposition. This polarizing beam splitter 73 is set such that it reflects the light polarized by the first polarizer 71 and transmits the reflected light from sample S which has travelled through quarter wave plate 72.

Reference numeral 74 designates a second polarizer which is located in an optical path between polarizing beam splitter 73 and picture recording means 60.

Reference numeral 75 designates a compensation plate for correction of the optical axis. Compensation plate 75 is located in the optical path between the quarter wave plate 72 and the first objective 41, and is one of the features according to the invention.

By means of the aforementioned arrangement of first polarizer 71, quarter wave plate 72, polarizing beam splitter 73 and second polarizer 74 in the optical path which runs from illumination optics system 30 via sample S to picture recording means 60, gathering of light scattered from a surface of rotating scanning disk 21 by means of the picture recording means 60 is prevented. Therefore, a resulting reduction of contrast can be prevented.

In confocal optical microscope 500, quarter wave plate 72 is arranged such that a perpendicular on its surface is tilted relative to an optical axis formed by first objective 41 and first imaging lens 51 (hereafter, "reference optical axis"). By the arrangement in which quarter wave plate 72 is inclined to the reference optical axis, the light from the pinholes of rotating scanning disk 21 which is reflected from the surface and/or the rear side of quarter wave plate 72 is not concentrated in the pinholes in the locally irradiated area of rotating scanning disk 21 which essentially agrees with the field of view of the picture recording means and is shown in FIG. 2 by A. This reflected light is, therefore, not gathered by picture recording means 60, and therefore, a partially enlarged image of the recorded sample S to be measured can be obtained with high contrast.

In the confocal optical microscope with the configuration described above, the sample is observed and measured as follows:

Radiation light from light source 31 is concentrated by means of arc relay lens 36 into the pinhole of plate-like part 35. The light which has travelled through this pinhole is reflected after one passage through pinhole relay lens 37 and convened by means of first polarizer 71 into a linear polarization by polarizing beam splitter 73 and is concentrated on an exit pupil of second objective 42.

The concentrated light flux is convened by means of second objective 42 into a parallel light flux and it locally irradiates the locally irradiated area A (FIG. 2) of rotating scanning disk 21 provided with pinholes. The locally irradiated area A essentially conforms with the field of view of picture recording means 60 (a region which can gather light).

The light which locally irradiates the surface of rotating scanning disk 21 travels through each of the pinholes of rotating scanning disk 21, field lens 43 and first imaging lens 51. Furthermore it is converted by passage through quarter wave plate 72 into a circular polarization, then travels through the optical axis compensation plate 75 and is concentrated on an exit pupil of first objective 41. The concentrated light flux is converted by means of first objective 41 into an essentially parallel light flux and uniformly illuminates the surface of the wafer as the sample S to be measured.

On the other hand, the light flux which has travelled through a pinhole of rotating scanning disk 21, converted by passage through field lens 43 and first imaging lens 51 into a parallel or approximately parallel light flux, is incident in first objective 41 after one passage through quarter wave plate 72 and the optical axis compensation plate 75, and is concentrated in essentially one point of the surface of sample S (the surface of the resist pattern).

The light which has illuminated sample S is reflected from its point of illumination on the surface of sample S and travels through first objective 41, the compensation plate 75, quarter wave plate 72, first imaging lens 51 as well as field lens 43, and is, again, imaged in the pinholes of the rotating scanning disk 21.

The reflected light which is directed from first objective 41 towards first imaging lens 51 is converted by passage through the quarter wave plate 72 from circular polarization into a linear polarization which has a direction of polarization turned 90° with respect to the illumination light.

The reflected light from the surface of the sample S which has travelled through the pinholes of rotating scanning disk 21 travels through second objective 42 and reaches polarizing beam splitter 73. This reflected light travels through polarizing beam splitter 73, second polarizer 74, second imaging lens 52 and eyepiece 61, and is incident on picture recording means 60 and is imaged since the reflected light, as the result of passage through quarter wave plate 72, has a linear polarization which has a direction of polarization turned 90° with respect to the illumination light.

In FIG. 2, a broken line designates an optical path of all of the illumination light which reaches sample S from the illumination optics system 30, and a solid line designates an optical path in which the light, which has travelled through a pinhole of rotating scanning disk 21 to be concentrated at one point on sample S, is reflected from sample S and travels to reach picture recording means 60.

In this embodiment of confocal optical microscope 500, quarter wave plate 72 is arranged such that a perpendicular on its surface is inclined relative to the reference optical axis formed by first objective 41 and first imaging lens 51. By means of the configuration in which quarter wave plate 72 is inclined to the reference optical axis, the reflected light which is reflected from the surface and/or rear side of the quarter wave plate 72 is not concentrated in the pinholes in the locally irradiated area A. This reflected light is, therefore, not gathered by the picture recording means 60, so that a good image with high contrast can be observed.

Since length measurement is done based on this partially enlarged image with high contrast, with respect to a length of the material component of sample S to be measured (in this example, a width of the resist line) or a length between the aforementioned material components (in this embodiment, a distance between the resist lines) positions of starts and ends thereof (in this embodiment edges of the resist line) can be recognized and determined simply and at the same time accurately. In this way, measurement results can be obtained with high measurement accuracy, high reproducibility, and high reliability.

In the case in which the quarter wave plate is not inclined relative to the reference optical axis, the reflected light from the surface and/or the rear side of the quarter wave plate is concentrated in the pinholes in locally irradiated area A once again. In particular, the light reflected from the rear side of quarter wave plate 72 as the result of the direction of polarization turned 90° with respect to illumination light is finally, for the most part, gathered by the picture recording means, and reduces the contrast of the partially enlarged image of sample S to be measured, adversely affecting the reliability of the measurement result in the length measuring device.

An angle of incline of the quarter wave plate (an angle to the reference optical axis of the perpendicular on the surface) is determined with respect to the following points:

1) The reflected light from the surface and/or the rear side of the quarter wave plate should not be concentrated in the pinholes in the locally irradiated region A.

2) The function as a quarter wave plate must be maintained. That is, it must be possible to generate a phase difference in a range from $\frac{1}{5}\lambda$ to $\frac{1}{3}\lambda$.

3) An optical imaging error resulting from the tilt must be negligibly small.

With respect to the aforementioned point 1 the angle of incline $\Theta$ based on a diameter of the locally irradiated area and a focal distance of the first imaging lens can be determined. Specifically, condition or formula (1) given below must be satisfied. It is desirable to satisfy condition or formula (2) given below in addition.

$$\Theta \geq \sin^{-1}(d/2f) \quad \text{Formula (1)}$$

$$\Theta \geq 2 \times \sin^{-1}(d/2f) \quad \text{Formula (2)}$$

In formulas (1) and (2), d designates the diameter of the locally irradiated areas and f is the focal length of the first imaging lens.

With respect to the aforementioned points 2 and 3, it is necessary that the angle of inclination $\Theta$ be less than or equal to 10°.

This means that the angle of inclination $\Theta$, with consideration of an ordinary magnitude of the locally irradiated area and a conventional focal length, is in a range from 3° to 10°.

In this embodiment of confocal optical microscope 500, the angle of inclination $\Theta$, based on substitution of a diameter d of the locally irradiated area A of 4 mm and a focal length f of first imaging lens 51 of 95 mm in formula (2) described above $(2 \times \sin^{-1}(4/(2 \times 95)) = 2.41°)$, is determined to be 3°.

By means of the measure by which the quarter wave plate 72 is inclined, the optical axis is shifted, in a transverse direction, for the light flux which has traveled through this quarter wave plate 72. This shift of the optical axis is, however, corrected by means of the optical axis compensation plate 75.

Figure 3:
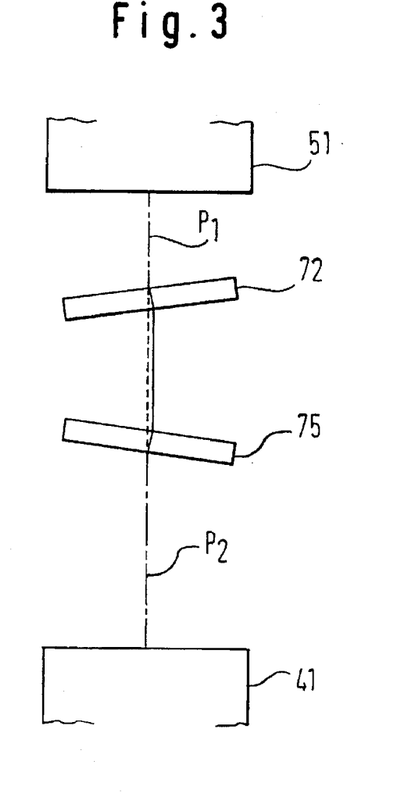
FIG. 3 shows a schematic representation of a state in which a deviation of an optical axis is corrected by a compensation plate of the optical axis.

FIG. 3 schematically shows a state in which the shift of the optical axis is corrected by the optical axis compensation plate. In the representation, the optical axis compensation plate 75 is located below quarter wave plate 72, so that the optical axis compensation plate 75 is inclined in a direction opposite to the direction of inclination of the quarter wave plate 72. In this way, the optical axis $P_1$, formed from first imaging lens 51 and quarter wave plate 72, and the optical axis $P_2$, formed from the optical axis compensation plate 75 and first objective 41, are positioned on the same line.

An amount of correction to eliminate the shift of the optical axis can be set arbitrarily by changing the thickness and angle of inclination of the optical axis compensation plate 75. In this embodiment, a shift resulting from quarter wave plate 72 of roughly 10 microns is corrected by an optical axis compensation plate 75 with a thickness of 0.51 mm that is arranged at an angle of inclination of 3°.

By means of the aforementioned configuration of the optical axis compensation plate 75 (which is simple to the maximum degree) in the optical path between first objective 41 and first imaging lens 51, the deviation of the optical axis caused by the inclination of the quarter wave plate 72 is eliminated with certainty. In this way, the occurrence of an optical imaging error due to the deviation of the optical axis can be reliably avoided, the contrast in the partially enlarged image of sample S to be measured can be increased even more, and the measurement accuracy and reproducibility are even more improved.

In the case in which the optical axis compensation plate 75 is not provided, beginning from the quarter wave plate, an optical imaging error is formed in the optical systems, even if the shift is only as small as roughly 10 microns. In this case, there is the danger that the reliability of the measurement results is adversely affected. To prevent this optical imaging error, an arrangement of the optical systems with consideration of the shift of the optical axis in front of and behind the quarter wave plate would be also conceivable. An arrangement of this type however cannot be implemented due to difficult mechanical alignment.

Figure 4:
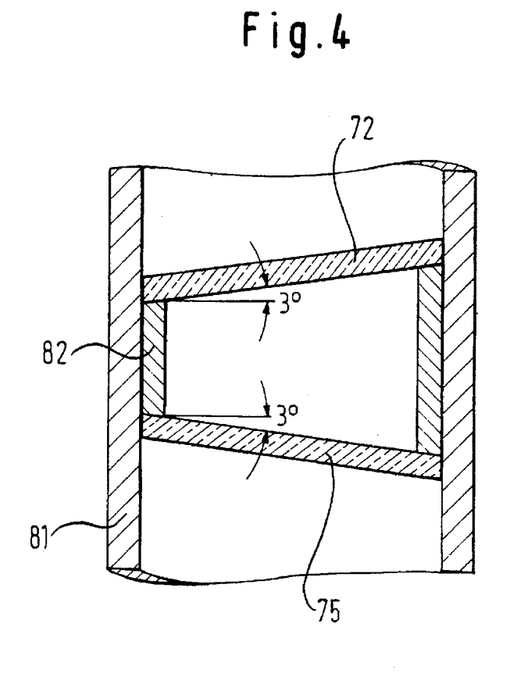
FIG. 4 shows a schematic cross-sectional representation of a state in which a quarter wave plate and the compensation plate of the optical axis are installed in an optical path between a first imaging lens and a first objective.

FIG. 4 is a schematic cross-sectional representation of a state in which quarter wave plate 72 and optical axis compensation plate 75 are installed in the optical path between the first imaging lens 51 and the first objective 41 (which are not shown in this figure). In the FIG. 4, reference numeral 81 designates a brass cylindrical holding part which surrounds the optical path described above, and the reference numeral 82 designates a ring-shaped spacer piece whose upper and lower ends are each inclined exactly 3°.

Quarter wave plate 72 and optical axis compensation plate 75 are each cemented onto the upper end and the lower end of spacer piece 82, and in this state, are inserted within the cylindrical holding part 81. By means of this construction, installation can be easily performed without errors occurring in the angle of inclination of the quarter wave plate 72 and of the optical axis compensation plate 75, and without the need for accurate position alignment in the horizontal direction.

Ultraviolet radiation cutting filter 34, which comprises illumination optics system 30, is a short-wave radiation attenuation means which has a dielectric multilayer film and has a function of attenuating light with wavelengths of less than or equal to 380 nm from the light radiated from light source 31 to less than or equal to 0.5%.

The light with wavelengths of less than or equal to 380 nm degrades the lenses (glass material) in themselves or the adhesive for cementing the respective lens, and thus, causes a reduction in the light transmissibility of the lens system. In this embodiment, therefore, by the arrangement of ultraviolet radiation cutting filter 34, light with these short waves is effectively eliminated, so that the reduction in light transmission of the optical system which occurs over time is suppressed. In this way, a bright image can be observed over a long time interval. Specifically, in the case in which the ultraviolet radiation cutting filter 34 is not provided, the brightness of the image decreases after 1000 hours by roughly 30%, while the degree of decrease in image brightness can be suppressed to less than or equal to 5% by providing ultraviolet radiation cutting filter 34.

In this way, a reduction of the amount of light for picture recording means 60 is prevented, and a sufficient initial signal-to-noise ratio (SN) can be ensured. At the same time, reliability of measurement results can be maintained over a long time interval, since the measurement conditions do not fluctuate over time.

However, not only can confocal optical microscope 500 be used with the configuration described above, but various changes can be effected, for example:

(1) instead of the rotating scanning disk provided with pinholes, an aperture plate with a pinhole can be used. In this case, by scanning the sample to be measured, a partially enlarged image of the sample to be measured can be obtained;

(2) instead of the ultraviolet radiation cutting filter, a mirror which has wavelength selectivity can be used as the short-wave radiation attenuation means; and (3) it is enough to use an ultraviolet radiation cutting filter which attenuates at least light with wavelengths less than or equal to 340 nm. However, as the result of improving ultraviolet light resistance of the glass material which comprises the lens system, as well as of the adhesive, a filter can be used which transmits shortwave light with wavelengths of greater than 340 nm (341 nm to 380 nm).

In this embodiment, between illumination optics system 30 and polarizing beam splitter 73 is first polarizer 71, and between polarizing beam splitter 73 and picture recording means 60 is second polarizer 74. However it is not absolutely essential to provide these polarizers.

First polarizer 71 transmits originally only light with a polarization characteristic under the radiation light from illumination optics system 30 which is reflected by polarizing beam splitter 73. The radiation light from illumination optics system 30 can, however, also be reflected even without the aid of first polarizer 71 by means of polarizing beam splitter 73. The light which has travelled through polarizing beam splitter 73 as the reflected light from sample S, likewise, has a certain polarization characteristic and can be directly incident in picture recording means 60 without further increasing its accuracy by second polarizer 74.

Computing means 600 is a means for computing the length of the line width of the resist pattern formed on the wafer or the distance between the resist patterns. In this case, the width of the resist pattern along a line, or the distance between the resist patterns, is computed based on the partially enlarged image of the sample S to be measured, which has been recorded by picture recording means 60 of confocal optical microscope 500. Specifically, a difference of brightness in the partially enlarged image described above is defined as the difference of the amount of light of the reflected light from sample S to be measured, a part with a large difference in the amount of light (one edge of the resist line) is recognized, the position thereof is determined as the start, another part with a large difference in the amount of light (another edge of the resist line described above) is recognized, the position thereof is determined as the end, and thus, a distance from the ascertained start to the ascertained end is computed.

Monitor 700 displays the partially enlarged image of sample S to be measured, which has been recorded by picture recording means 60 of confocal optical microscope 500, as video information in real time. In addition, monitor 700 displays the measurement results which have been computed by computing means 600 and which are, also, output by the printer 800.

Control means 900 is a means for controlling movable carrier 700, the carrier device for the sample S to be measured, confocal optical microscope 500, computing means 600, monitor 700 and printer 800 under the stipulated measurement conditions. The measurement conditions are, in this case, determined according to the various types of sample S to be measured, or the like, and are input beforehand into control means 900 by an inputting means which is not shown in the drawing.

Below a process of measuring the line width of the resist pattern formed on the wafer is described using the length measuring device with the aforementioned configuration:

(1) Transport and Seating of the Wafer

One of the wafers W inserted in wafer cassette C is removed by high speed carrier robot 420, carded and then seated on carrier stage 310.

(2) Position Control (Positioning in the Direction of Axis X-Y)

Carrier stage 310 is moved by moving device 32X and moving device 32Y in the directions of X and Y axes until a measurement part of the seated wafer W falls into the field of view of confocal optical microscope 500.

(3) Focussing (Positioning in the Direction of Axis Z)

By means of moving device 32Z positioning in the direction of the Z axis is performed, i.e., focussing of confocal optical microscope 500:

a) First, carrier stage 310 is fluttered in the direction of axis Z until the measurement part of wafer W reaches a position which is called the focal point of confocal optical microscope 500. Fluttering of the carrier stage 310 is effected by the motor device of moving device 32Z.

b) Next, carrier stage 310, based on the position described above, is moved slightly in the direction of the Z axis, so that accurate focussing is effected. The slight movement of carrier stage 310 is effected by piezoelements of moving device 32Z, for example, within a range of ±20 microns from the reference position described above.

Meanwhile, an enlarged image of the measurement part of the wafer W is displayed by the monitor 700 and the video information is viewed. Slight movement of carrier stage 310 is stopped when a position has been reached in which this enlarged image has maximum brightness. The focal point of confocal optical microscope 500, in this case, is on a surface level (resist bottom level) of wafer W seated on carrier stage 310. The reason for this is that the surface of wafer W has a maximum reflection factor and when positioning the focal point on the surface level of the wafer W, the amount of light for picture recording means 60 reaches a maximum amount.

In addition, not only the size of the width of the resist line on the surface level of wafer W, but a size of a width of the resist line at a desired level (for a residual offset) can be measured, this level extending from the surface of wafer W to one surface of the resist, if a clear contrast can be maintained.

Moreover, the width of the resist line in each step can be measured from the surface of the wafer W up to the surface of the resist by gradually height changing for a certain amount of movement (for example, at 12 nm, 100 steps). This length measurement can be easily used to average data in the vicinity of a level to be attained, or for similar purposes, and can increase the reproducibility (stability) of the measurement results.

(4) Picture Recording of the Partially Enlarged Image of the Wafer

The image of the resist pattern which is formed on the wafer to be measured is recorded by confocal optical microscope 500 of picture recording means 60 shown in FIG. 2, as described above.

(5) Length Measurement of the Width of the Resist Line (Computation)

By means of computing means 600, the width of the resist line is computed. Computation by computing means 600 is performed based on the partially enlarged image of the wafer W recorded by picture recording means 60 (image of the resist pattern).

This means that a difference of the brightness in the partially enlarged image described above is defined as the difference of the amount of light of the reflected light from the wafer, a part with a large difference in the amount of light (a boundary region from "bright" to "dark" in the partially enlarged image) is recognized as the edge of one end of the resist line to be measured, the position thereof is determined, another part with a large difference in the amount of light (a boundary region from "dark" to "light" in the partially enlarged image) is recognized as the edge of another end of the resist line to be measured, the position thereof is determined, and thus, a distance between them (the width of the resist line) is computed.

Since this partially enlarged image has a maximally high contrast, the positions of the edges of the resist line can be recognized and determined easily, and at the same time, accurately since the boundary areas between "brightness" and "darkness" are clearly defined. In this way, measurement results can be computed with high reliability.

(6) Output of Measurement Results

The results computed by means of computing means 600 are displayed by monitor 700 and are output at the same time as required by means of printer 80.

(Test)

For a wafer on which a line and space pattern of 0.4 microns is formed, the width of the resist line was measured by means of an electron microscope of the scanning type and a probable value ($L_o$) was computed. Finally, this width was measured by means of the length measuring device according to the invention 300 times. In this case all measured values were within a range of $L_o\pm0.025$ (microns) and a measurement reproducibility (3σ:σ designates a standard deviation) was less than or equal to 0.015 microns. In this way, it was confirmed that, by means of the length measurement device using this embodiment, a length measurement of fine resist patterns can be taken with high measurement accuracy and high measurement reproducibility.

Action of the Invention

Using the confocal optical microscope according to the invention with an inclined quarter wave plate, the reflected light from the surface and the rear side of the quarter wave plate is concentrated neither in the locally irradiated area of the aperture plate nor gathered by the picture recording means. In this way a good image with high contrast can be observed.

Using the confocal optical microscope with an optical axis compensation plate disposed in an optical path between the objective and the imaging lens, deviation of the optical axis due to the inclination of the quarter wave plate was eliminated with certainty by the arrangement of the optical axis compensation plate in the optical path between the objective and the imaging lens. In this way occurrence of an optical imaging error due to the deviation of the optical axis can be reliably avoided.

Using the confocal optical microscope with a first polarizer arranged between the light source and the polarizing beam splitter for polarization of the light irradiating one side of the aperture plate and a second polarizer arranged in the optical path between the polarizing beam splitter and picture recording means, high light transmission in optical systems can be stably maintained by attenuation of the short-wave light which degrades the adhesive for joining the lens or lens systems under the radiation light from the light source by means of the short-wave radiation attenuation means and a bright image can be observed over a long time interval.

A length measurement device using a confocal optical microscope in accordance with the invention allows a length measurement to be taken based on a partially enlarged image with high contrast. In this way, measurement results can be obtained with high reliability which has high measurement accuracy and high reproducibility since the contrast of the partially enlarged image of the sample to be measured can be increased even more and a drop in the amount of light which occurs over time for a picture recording means is prevented. In this way a sufficient initial SN ratio is ensured, and at the same time, the reliability of the measurement results can be maintained over a long time interval because the measurement conditions do not fluctuate over time.

It is to be understood that although only a preferred embodiment of the invention has been described, various other embodiments and variations may occur to those skilled in the art. Any such other embodiments and variations which fall within the scope and spirit of the present invention are intended to be covered by the following claims.

What we claim is:

1. Length measuring device having a movable carrier which enables at least one movement forward, backward, to the right and to the left and movement in a vertical direction, a carrier device for a sample to be measured for bearing the sample to be measured and for seating the sample on the moveable carrier, an optical microscope which picks up a partially enlarged image of the sample to be measured seated on the moveable carrier, a computing means for computing a distance across or between material components of the sample to be measured based on the partially enlarged image of the sample picked up by the optical microscope, a display means for display of the partially enlarged image of the sample which was picked up by the aforementioned optical microscope, as well as measurement results which have been computed by said computing means, and a control means for controlling the movable carrier of the carrier device, the optical microscope, the computing means, and the display means under measurement conditions; wherein the optical microscope is a confocal optical microscope which has a aperture plate provided with at least one pinhole, a light source for local irradiation of a first side of the aperture plate, a first polarizer for polarization of light irradiating said first side of the aperture plate, an objective which is arranged for positioning adjacent to the sample to be measured on an opposite, second side of the aperture plate, an imaging lens which is arranged between said objective and said aperture plate for imaging a partially enlarged image of the sample to be measured onto the aperture plate in an optical path between the aperture plate and the objective, a quarter wave plate located in an optical path between the imaging lens and the objective, a polarizing beam splitter located on said firs side of the aperture plate in an optical path between the first polarizer and the quarter wave plate, a picture recording means for gathering light reflected from the sample to be measured via the polarizing beam splitter and for picking up the partially enlarged image of the sample to be measured, and a second polarizer which is located in an optical path between the polarizing beam splitter and the picture recording means, and wherein the quarter wave plate is arranged with a surface thereof inclined in manner causing a line perpendicular to said surface to be inclined with respect to an optical axis extending between the objective and the imaging lens.

2. Length measuring device according to claim 1, wherein the confocal optical microscope has a optical axis compensation plate for correcting a deviation of the optical axis in front of and behind the quarter wave plate which is caused by the inclination of the quarter wave plate, said compensation plate being located in the optical path between the objective and imaging lens.

3. Length measuring device according to claim 1, wherein the confocal optical microscope has a shortwave radiation attenuation means for attenuating light from the light source having wavelengths less than or equal to 340 nm.

4. Length measuring device according to claim 1, wherein the aperture plate of the confocal optical microscope is a rotating scanning plate provided with pinholes.

\* \* \* \* \*